May 19, 1936.  W. H. FRANK ET AL  2,041,675
ELECTRICAL DISTRIBUTION SYSTEM
Filed Oct. 9, 1933   2 Sheets-Sheet 1
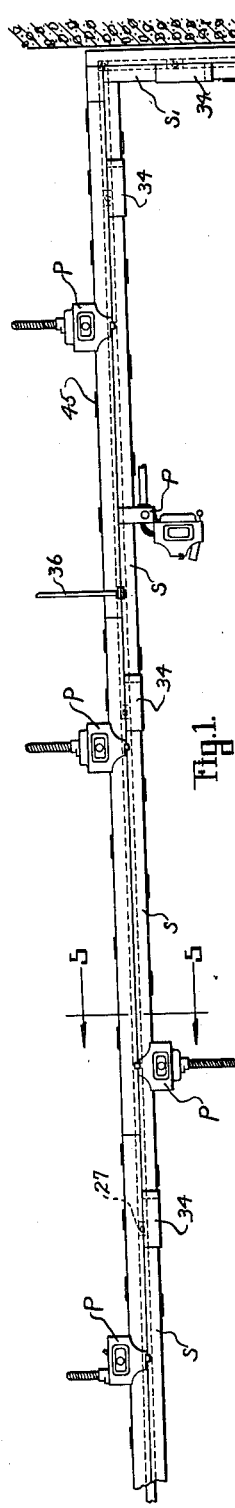
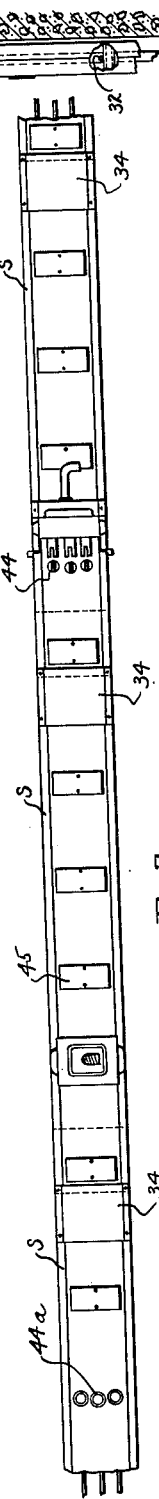
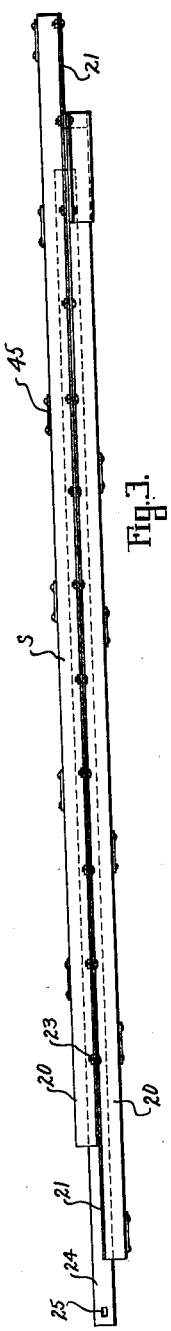
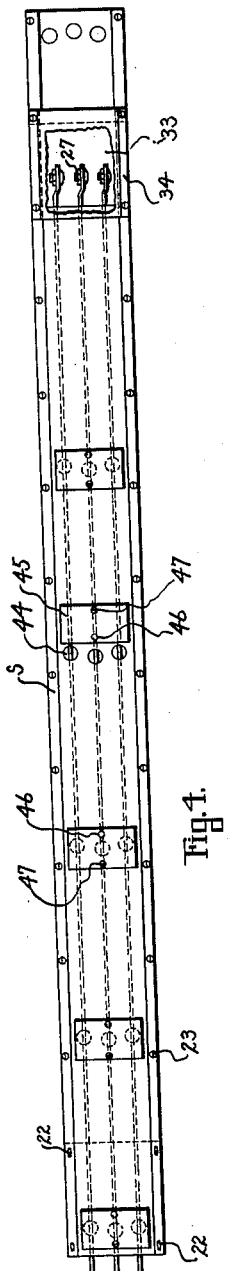
INVENTORS.
William H. Frank
Joseph W. Harper
BY
Daniel G. Cullen
ATTORNEY.

May 19, 1936.  W. H. FRANK ET AL  2,041,675
ELECTRICAL DISTRIBUTION SYSTEM
Filed Oct. 9, 1933  2 Sheets-Sheet 2

INVENTORS
William H. Frank
Joseph W. Harper
BY
Daniel Cullen
ATTORNEY.

Patented May 19, 1936

2,041,675

UNITED STATES PATENT OFFICE 2,041,675

ELECTRICAL DISTRIBUTION SYSTEM

William H. Frank and Joseph W. Harper, Detroit, Mich., assignors to Bulldog Electric Products Company, Detroit, Mich., a corporation of West Virginia Application October 9, 1933, Serial No. 692,910

17 Claims. (Cl. 247—3)

This application relates to electrical distribution systems. It more particularly relates to that class of systems which is sometimes referred to as the bus-duct type since systems of that type generally comprise a duct run containing bus bars, and with which are to be associated at desired intervals current take-off devices.

In duct run constructions known at present, the duct run generally includes a sheet metal casing through which run bus bars and the casing is apertured, at various points to permit the contacts of the take-off devices to be inserted through the casing and into engagement with the bus bars. In known constructions, the casings are made of sheet metal formed in the nature of a duct and having movable or removable wall portions and each casing is so constructed that a certain one of its walls is definitely a bottom wall and another is definitely a top wall, considering the duct as being in a horizontal run. In the present construction, hereinafter described, the casing is formed of two identical casing halves joined so as to form a symmetrical casing having parallel walls, either of which may be utilized as a top or bottom, as desired. The advantages of making the duct casing in this form will be enumerated and described at a later stage of this specification.

The duct run hereinafter described possesses other novel features of design which make it more satisfactory in certain aspects and for certain purposes than duct runs heretofore known, and these features will also be enumerated and described at a later stage of this specification.

Other features of the inventions of this application will be more particularly described at a later stage of this specification so as to be readily apparent to those skilled in the art upon reference to the appended drawings.

Fig. 1 is a fragmentary side elevational view of an electrical distribution system at the intersection of a horizontal bus-duct run and a vertical bus-duct run, these duct runs being shown as provided with various types of current take-off devices at various points, where are located external-access-providing holes in the duct casings;

Fig. 2 is a partially cut away bottom plan view of the horizontal run portion thereof;

Figs. 3 and 4 show a standard bus duct section, in side and bottom plan views;

Figure 5:
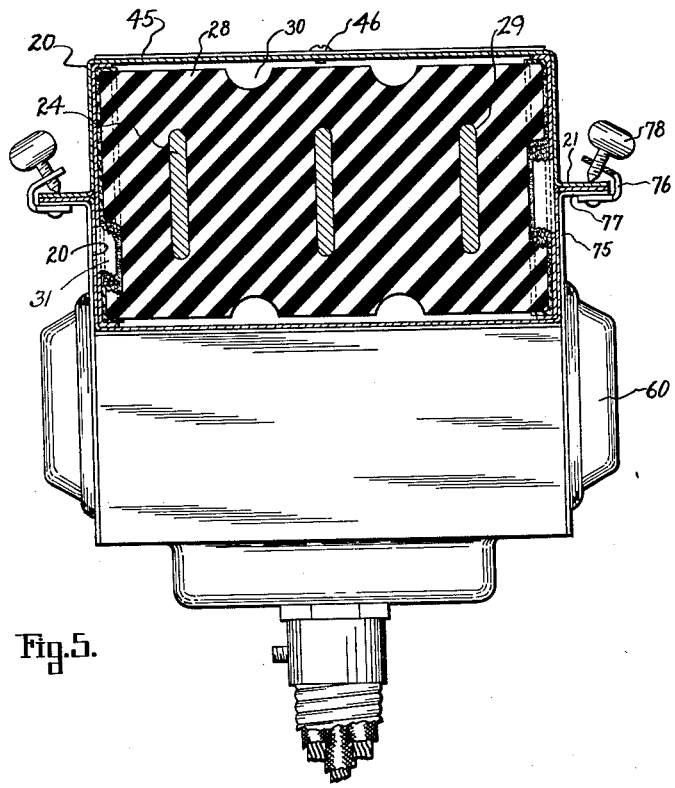
Fig. 5 is a sectional view, as if on line 5—5 of Fig. 1.

It will be understood at the outset that the systems under discussion include interconnected duct runs, with which current take-off or plug-in devices may be associated. The duct runs may include horizontal and vertical runs, and may have different details of construction, and the current take-off devices may well be of the hinged or articulated or of the non-hinged or non-articulated type, for use with rigid or flexible branch circuit conduits; and it will be understood that various types of current take-off devices may be associated with various types of duct runs, and that other associations than those specifically shown, in the drawings are contemplated as being within the scope of this description.

Referring to Figs. 1 and 2, it will be seen that the duct run is made up of standardized, pre-equipped identical sections S of equal length, and fittings S1, one of which, an elbow, is shown in Fig. 1. Each section includes two similar or identical sheet metal casing halves 20 of equal length and having cooperating longitudinal edge flanges 21 through slotted holes 22 of which pass casing joining bolts 23. Inside the casing formed by the juxtaposition of the halves are bus bars 24 having ends apertured at 25, and the center-to-center distance between the apertures 25 is equal to the length of the casing halves.

The bus bars 24 are electrically and mechanically connected to one another by lap-scarf joints at their ends (Fig. 4), effected by the bolts 27 passed through the apertures 25 at the ends of the bus bars.

The casing halves and the bus bars therein are so proportioned and positioned, in each section, that lap-scarf joints between sections, both as regards to the casings and as regards to the bus bars, may be readily effected, merely by moving the end of one section towards the end of its neighbor. As indicated, the right end of each upper casing half, in each section of the horizontal run of Fig. 1, extends beyond the right end of its lower casing half a distance equal to the amount that the left end of each lower casing half extends beyond the left end of each upper casing half; and the bus bars, at their left ends, extend to the left beyond the left end of each lower casing half a distance equal to the amount that the right end of each bus bar terminates short of the right end of each lower casing half. Thus, when a section end is moved towards an adjacent section end, proper relative interfitting of the casing ends and of the bus bar ends will take place.

The bus bars 24 are supported in the casing by supporting plates or blocks 28 of insulation (Fig. 5) having slots 29 which cooperate to define apertures through which pass the bus bars. These plates are also provided with vents 30 for venting the duct run, and the supporting plates 28 are supported in the casing by felt-lined channelled metal guides 31 spot welded to the casing halves, it being preferred to weld all the guides of a section to one casing half thereof. These parts are all assembled during the manufacture of the casing sections S to form pre-equipped sections.

The supporting plates 28 not only support the bus bars but also space them evenly and serve as insulators for them. Furthermore, in vertical runs (Fig. 1) the bus bars are prevented from longitudinal or vertical movement in the casing by wooden or fiber pegs 32 passed through holes of the bus bars, and these pegs, projecting beyond the sides of the bus bars, engage and rest on supporting plates 28, thereby supporting the bus bars.

It will also be seen that the casing walls are cut out, near the section ends, and at points overlying bus bar joints, to provide hand holes 33 through which access may be had to the bus bar ends for purposes of manipulating their connecting bolts 27, and that these hand holes are normally covered by channelled hand hole cover plates 34 secured in place by certain of the bolts 23 passed through the edge flanges 21.

The duct run sections can be pre-equipped in the factory, where they are first made into complete sections, and later fabricated into a duct run, on the job, as is preferred; or their parts may be individually assembled on the job into a duct casing run, through an assembled one of which will be passed bus bars to form a duct run. The former method is preferred, but the construction shown is such that either method may be used, as desired.

Further, if the former method is chosen, duct run sections can be installed by moving them longitudinally or laterally, the lap joints between sections permitting either installing movement. This feature is of importance, particularly, when end space is at a premium, or when duct runs are dismantled, in which case, an intermediate section may be removed without disturbing its mounted neighboring sections.

The duct run may be supported in any desired manner. Fig. 1 shows a horizontal duct run supported with the bus bars in a horizontal row parallel to the supporting plane, and in this case plug-in devices will be associated with horizontal walls of the duct run. The hangers may be tie bolts 36 (Fig. 1) passing through the flanges 21.

It will be observed that the supporting means is disposed completely outside of the casing, and therefore, the possibility of grounding the bus bars thereby is eliminated.

It will further be seen that the flanges 21 serve, not only as locations for the casing halves joining bolts, and as abutments, supports, and latch parts, for plugs, as will later be brought out, but also serve to rigidify the free edges and walls of the casing halves.

At intervals along the sections there are provided external-access-providing means, such as the holes 44 aligned with the bus bars, and through these and thus through the casing contacts may be inserted for engagement with the bus bars for current take-off. These contacts form parts of current take-off or plug-in devices, P, several types of which are shown.

In furtherance of the aim for standardization, the lengths of the sections are equal to integral multiples of the distances between the pairs of slotted holes 22, the bus bar supports 28, and the holes 44, all in accordance with well known principles of standardization.

Inasmuch as the casing halves are identical, plug-in may be effected from either side of the duct-run. This feature is of importance, in that it enhances the flexibility of the system, not requiring the branch circuit conduits to come off any one side of the run.

Further, the fact that the casing halves are identical makes it unnecessary to select a particular side as the bottom, in a horizontal run, or as the front, in a vertical wall or column run, and accordingly, angle bends in a run may be effected much more simply than in the case where discrimination must be exercised in the selection of bottom or front, as is true of casings having non-symmetrical casing halves.

Further, it will be seen that the holes can be covered up by plates 45 swivelled to the casing on rivets or bolts at 46 and secured in place, over the holes, or away from them, by screws 47. If desired, as an alternative, the duct run can be installed with knockouts provided instead of the holes, as shown at 44a, Fig. 2, in which case the plates 45 will not be furnished as original equipment, but as later-to-be added equipment, for covering removed knockouts.

It will be observed that the holes 44 are not in transverse alignment but that the center one of each group is somewhat out of line with respect to the outer ones thereof. This prevents improper plug-in, and automatically insures proper polarization of the plugs with respect to the bus bars.

Further, the polarization method chosen does not require any disturbance to the symmetrical arrangement of the duct parts, particularly the bus bar and therefore does not interfere with the universal connection and mounting possibilities of the duct run.

Figures 6, 7:
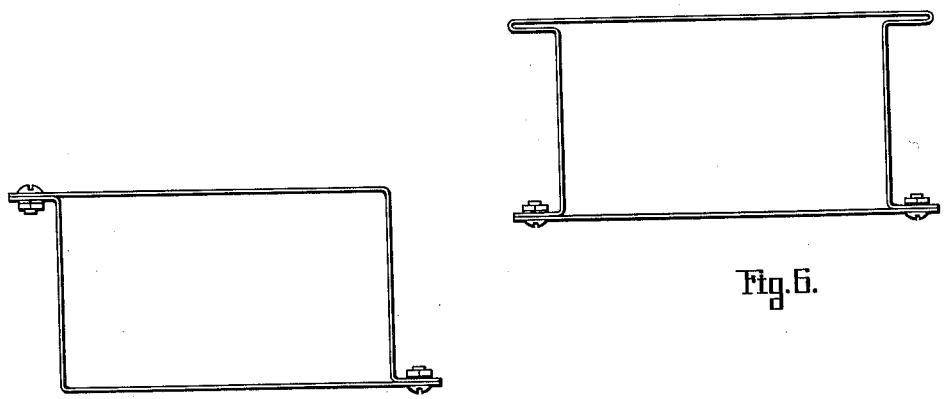
Figs. 6 and 7 show modifications of duct casing halves in end elevation.

Figs. 6 and 7 show alternative casing formations, regarded as being equivalent to a greater or lesser extent, to the casing formation shown in Figs. 1–5. One other formation, not here shown, includes two identical halves, differing from those of Figs. 1–5 in that the dihedral angle between the adjacent walls of each casing half is obtuse, rather than a right angle, this permitting nesting of the halves.

The current take-off or plug-in devices for use with the duct run of Figs. 1 and 2 will now be described generally. Generally, the most widely used form of plug-in device, to be used with flexible branch circuit conduit, is in the nature of a non-articulated head 60 containing pairs of fuse clips with the clips of each pair separated and electrically connected by a cartridge fuse, one set of the clips being connected to the terminals of lead-off cables, and the other set being connected to contacts which are adapted to engage the bus bars. In this respect, these heads are of the type disclosed in the Frank Patent, 1,887,089, of November 8, 1932.

The heads have extensions 75 embracing the sides of the duct halves to guide the heads for plug in and these extensions have latch means 76, pivoted on the flanges 77 of the side extensions 75 and adapted to be hooked over the flanged edges 21 of the casing to latch the head to the casing at a plug-in point, and these latches have their lips directed towards the flanges 11 to assist in clamping and effectively securing the plug-in heads to the duct run. The latches are provided with pointed thumb screws 78 which aid in electrically connecting the plug casings 60 to the duct run casings 20 for grounding purposes.

It will be observed that the duct run here shown, in reality forms a distribution panel, and that it is especially adapted for use as a panel in that it is compact, self-supporting, double faced, and economical of space and manufacture.

It will further be observed that by virtue of the fact that sections of duct run may be used as panels, economies are effected when a run is wholly or partially dismantled, not all of the sections of the run being rendered obsolete, as is unfortunately the case with other systems now known; in this instance, sections removed from a run may be found useful as panels. For example, if upon remodeling of a building, duct run sections are found to have no utility as duct run, these sections may be utilized elsewhere in the system as panels, in accordance with teachings heretofore given.

Now having described the embodiments of the inventions, reference will be had to the appended claims for a determination of the scope of the inventions.

We claim:

1. A bus duct run comprising a closed duct run containing bus runs symmetrically disposed with respect to the duct run and with respect to one another, and symmetrically arranged, longitudinally disposed holes in the duct run through which may be plugged contacts for directly engaging the bus runs, the duct run sections being divided longitudinally and composed of cooperating members, which are identical and symmetrical in cross section.

2. A bus duct run comprising a closed duct run containing bus runs symmetrically disposed with respect to the duct run and with respect to one another, and symmetrically arranged, longitudinally disposed holes in the duct run through which may be plugged contacts for directly engaging the bus runs, the duct run sections being divided longitudinally and composed of cooperating members, which are identical and symmetrical in cross section, each section being in the nature of a pan provided with a wall forming a top or a bottom for the duct, opposite sides forming portions of sides of the duct, and flanges providing means for joining the pans to form a duct.

3. A bus duct run comprising a closed duct run containing bus runs symmetrically disposed with respect to the duct run and with respect to one another, and symmetrically arranged, longitudinally disposed holes in the duct run through which may be plugged contacts for directly engaging the bus runs, the duct run sections being divided longitudinally and composed of cooperating members, which are identical and symmetrical in cross section, each member being in the nature of a pan provided with a wall forming a top or a bottom for the duct, opposite sides forming portions of sides of the duct, and flanges providing means for joining the pans to form a duct, the assembled pans having the flanges midway of the sides of the duct.

4. A bus duct run comprising a closed duct run containing bus runs symmetrically disposed with respect to the duct run and with respect to one another, and symmetrically arranged, longitudinally disposed holes in the duct run through which may be plugged contacts for directly engaging the bus runs, the duct run sections being divided longitudinally and composed of cooperating members, which are identical and symmetrical in cross section, each member being in the nature of a pan provided with a wall forming a top or a bottom for the duct, opposite sides forming portions of sides of the duct, and flanges providing means for joining the pans to form a duct, the top or bottom wall of each pan being provided with the holes aforementioned.

5. A bus duct run comprising a closed duct run containing bus runs symmetrically disposed with respect to the duct run and with respect to one another, and symmetrically arranged, longitudinally disposed holes in the duct run through which may be plugged contacts for directly engaging the bus runs, the duct run sections being divided longitudinally and composed of cooperating members, which are identical and symmetrical in cross section, each section being in the nature of a pan provided with a wall forming a top or a bottom for the duct, opposite sides forming portions of sides of the duct, and flanges providing means for joining the pans to form a duct, the bus duct run being supported by means cooperating with the flanges.

6. A bus duct run comprising standard bus duct sections each of which includes a closed duct run containing bus runs, each standard section of duct run comprising two superimposed halves of equal length, the first of which projects beyond the second at one end, and the second of which projects beyond the first at the other end, the bus runs of each standard section being of the same length as the duct run of that standard section.

7. A bus duct run comprising standard bus duct sections each of which includes a closed duct run containing bus runs, each standard section of duct run comprising two superimposed halves of equal length, the first of which projects beyond the second at one end, and the second of which projects beyond the first at the other end, the bus runs of each standard section being of the same length as and substantially coterminous with the duct run of that standard section.

8. A bus duct run comprising a duct run having longitudinally spaced relatively small holes therein on its top and bottom surfaces, and having longitudinally extending beads on its sides midway of the top and bottom surfaces, and containing centrally disposed naked bus runs, plugs for said duct runs, the holes affording access through the duct to the bus bars for prongs or plugs on the top and bottom surfaces of the duct, the plugs having parts cooperating with the beads whereby the plugs are secured in place on the duct, on either of the top or bottom surfaces thereof.

9. A bus duct run comprising a duct run having longitudinally spaced relatively small holes therein on its top and bottom surfaces, and having longitudinally extending beads on its sides midway of the top and bottom surfaces, and formed of pans which come together, and containing centrally disposed naked bus runs, the beads being flanges of side walls of the pans, plugs for said duct runs, the holes affording access through the duct to the bus bars for prongs of plugs on the top and bottom surfaces of the duct, the plugs having parts cooperating with the beads whereby the plugs are secured in place on the duct, on either of the top or bottom surfaces thereof.

10. An electrical distribution system comprising a bus-duct run including a closed duct containing bus runs, the duct being provided with a multiplicity of separate holes longitudinally spaced therealong on two opposite sides thereof, and plugs at the holes, and disposed against two opposite sides of the duct run, and having contacts projecting through the holes and directly contacting the bus bars, the duct having longitudinally extending beads symmetrically disposed on its sides, the plugs having portions embracing the duct sides to the beads and provided with means for interlockingly engaging the side beads.

11. An electrical distribution system comprising a bus-duct run including a closed duct containing bus runs, the duct being provided with a multiplicity of separate holes longitudinally spaced therealong on two opposite sides thereof, and plugs at the holes, and disposed against two opposite sides of the duct run, and having contacts projecting through the holes and directly contacting the bus bars, the duct having longitudinally extending beads symmetrically disposed on its sides, the plugs having portions embracing the duct sides to the beads and provided with means for interlockingly engaging the side beads, the bus duct run being symmetrical so that the plugs may be applied to both of the opposite sides aforementioned without difficulty and interchangably.

12. An electrical distribution system including a duct run containing naked rigid flat narrow bus bar runs whose flat surfaces are substantially perpendicular to opposed sides of the duct run, these having entrances for contacts of plugs to be associated with the duct run with their contacts engaging the flat surfaces of the bus bar runs, the duct run also having duplicated formations for supporting the plugs on either opposite side, the bus bar runs being substantially symmetrical with respect to one another, the relation of the group of bus bar runs to the entrances and the plug supporting formations of one of the opposed sides being substantially similar to the relation of the group of bus bar runs to the entrances and the plug supporting formations of the other of the opposed sides.

13. A sectional duct run comprising duct sections joined end to end and divided longitudinally into cooperating members, one of which overlaps the other at one end and underlaps the other at the other end, a group of bus runs in the duct run symmetrically and similarly disposed with respect to the opposed surfaces of the members, plug entrances on opposite sides of the duct, the entrances on one side being longitudinally offset from the entrances on the opposite side so that a bus run part exposed to one entrance is not exposed to the opposite side entrance.

14. A sectional duct run comprising duct sections joined end to end and divided longitudinally to provide similar and complementary duct halves provided with external flange means for joining the halves longitudinally and for providing anchorages for the duct run, the duct halves being so arranged that one overlaps the other at one end and underlaps the other at the other end, the flanges providing means for joining neighboring duct sections in end to end relation, a group of bus runs in the duct run symmetrically and similarly disposed with respect to the meeting and joining lines of the duct halves.

15. In combination, a sectional duct comprising sections joined end to end and longitudinally divided to provide similar and complementary duct halves provided with external flange means for joining the halves longitudinally and for providing anchorages for the duct run, and bus runs in said duct run arranged in symmetrical relation with respect to the meeting and joining lines of the duct halves.

16. In combination, a sectional duct containing bus runs and comprising sections joined end to end and longitudinally divided to provide similar and complementary duct halves provided with external flange means for joining the halves longitudinally and for providing anchorages for the duct run, the duct half of one section overlapping its complementary half at one end and underlapping its complementary half at the other end to facilitate joining of sections end to end, the flanges providing means for joining neighboring duct sections in end to end relation.

17. An electrical distribution system including a duct run containing naked rigid flat narrow bus bar runs whose flat surfaces are substantially perpendicular to opposed sides of the duct run, these having entrances for contacts of plugs to be associated with duct run with their contacts engaging the flat surfaces of the bus bar runs, the duct run also having duplicated formations for supporting the plugs on either opposite side, the bus bar runs being substantially symmetrical with respect to one another, the relation of the group of bus bar runs to the entrances and the plug supporting formations of one of the opposed sides being substantially similar to the relation of the group of bus bar runs to the entrances and the plug supporting formations of the other of the opposed sides, the entrances on one side being longitudinally offset from the entrances on the opposite side so that a bus run part exposed to one entrance is not exposed to the opposite side entrance.

WILLIAM H. FRANK.
JOSEPH W. HARPER.

DISCLAIMER 2,041,675.—*William H. Frank and Joseph W. Harper*, Detroit, Mich. ELECTRICAL DISTRIBUTION SYSTEM. Patent dated May 19, 1936. Disclaimer filed March 15, 1943, by the assignee, *Bulldog Electric Products Co.*
Hereby disclaims claim 13 of said patent.
[*Official Gazette April 6, 1943.*]